J. K. STROSNIDER.
AUTOMOBILE LOCK.
APPLICATION FILED SEPT. 10, 1919.
1,377,224.
Patented May 10, 1921.
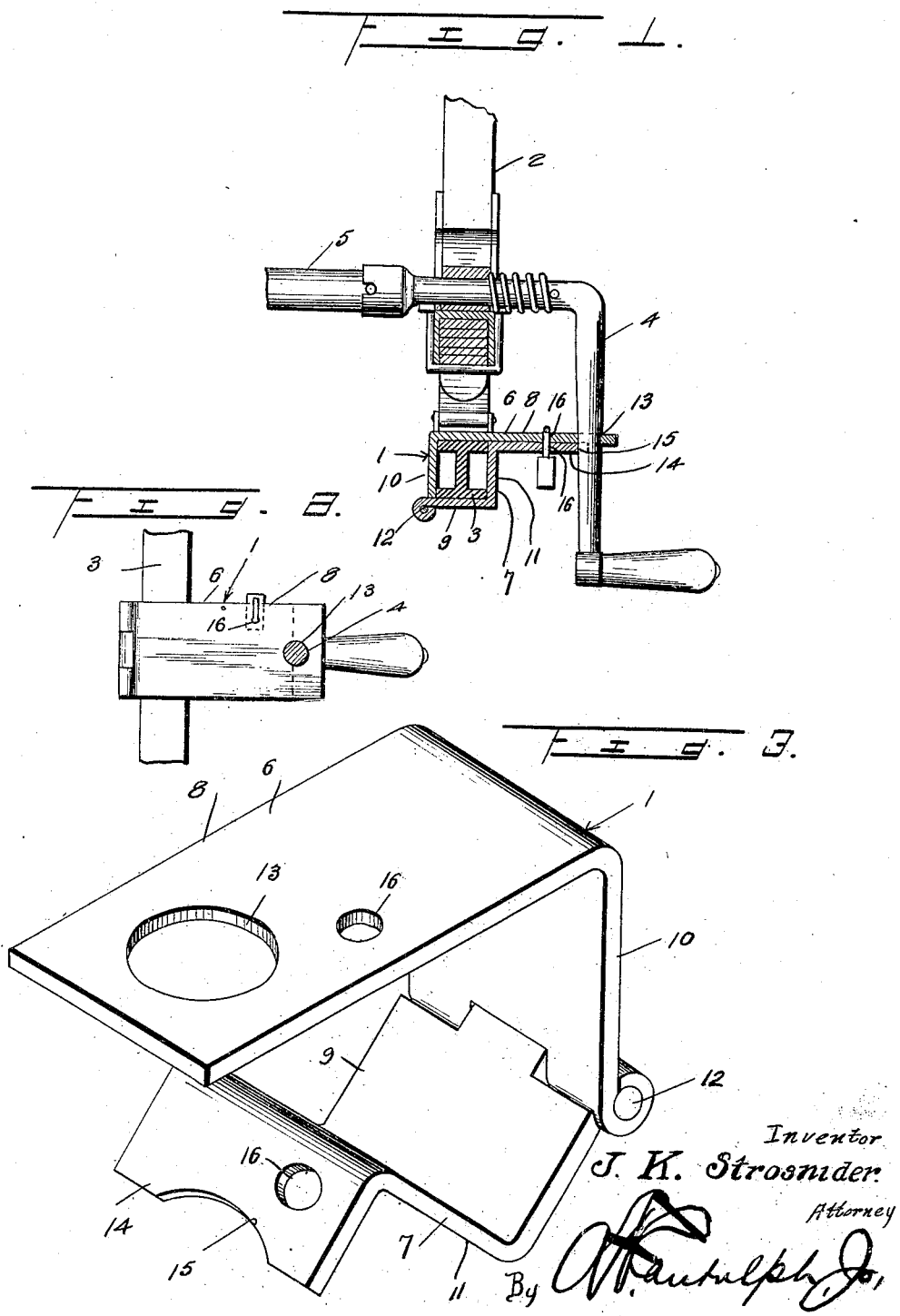
Inventor
J. K. Strosnider.
Attorney

UNITED STATES PATENT OFFICE.

JOHN K. STROSNIDER, OF SUGAR GROVE, OHIO.

AUTOMOBILE-LOCK.

1,377,224.  Specification of Letters Patent.  Patented May 10, 1921.

Application filed September 10, 1919. Serial No. 322,858.

*To all whom it may concern:*

Be it known that I, JOHN K. STROSNIDER, a citizen of the United States, residing at Sugar Grove, in the county of Fairfield and State of Ohio, have invented certain new and useful Improvements in Automobile-Locks; and I do hereby declare the following to be a full, clear, and exact description of the invention, such as will enable others skilled in the art to which it appertains to make and use the same.

This invention relates to automobile locks, and the primary object of the invention is to provide an improved attachment for motor vehicles for detachably engaging the starting crank, so as to prevent movement thereof and thus eliminate the possibility of the vehicle being started by unauthorized persons and stolen.

Another object of the invention is to provide an improved attachment for Ford automobiles for locking the crank against movement and in engagement with the crank shaft of the engine, so as to prevent movement of the starting crank and engine and thus prevent the stealing of the vehicle.

A still further object of the invention is to provide an improved attachment for motor vehicles of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, claimed and illustrated in the accompanying drawings, forming a part thereof in which:

Figure 1 is a partial sectional view showing the crank in locked position and in engagement with the crank shaft of the engine.

Fig. 2 is a plan view of the improved device, showing the crank in locked position.

Fig. 3 is an enlarged detail perspective view of the improved vehicle.

Referring to the drawings in detail, wherein similar reference characters designate corresponding parts throughout the several views, the numeral 1 generally indicates the improved attachment, which is adapted to be used in connection with a motor vehicle 2 of the ordinary construction, which includes the axle 3, the starting crank 4 and the crank shaft 5.

The improved device 1 includes a pair of angle plates 6 and 7 which are preferably formed of sheet metal or metal casting and each includes a horizontally disposed body 8 and 9 and inwardly directed arms 10 and 11. As clearly shown in Fig. 1 of the drawing the bodies 8 and 9 are adapted to engage respectively the upper and lower surface of the axle 3 and the arms 10 and 11 the rear and front surface of the axle, when the device is placed in operative position. The lower end of the arm 10 of the angular member 6 is hingedly connected to the rear end of the body 9 of the member 7 by a pivot pin 12 so that the members can be thrown in opposite direction so as to permit the convenient removal and placing of the device on the axle. The upper member 6 has its body 8 extended for a considerable distance beyond the body 9 of the lower member 7 and the axle 3 and the same is provided adjacent its outer end with a relatively large opening 13 which is in direct alinement with the central longitudinal axis of the body 8 for the reception of the starting crank 4, the purpose of which will be hereinafter more fully described. The upper end of the arm 11 of the lower member 7 is provided with a forwardly right angular extending portion 14 which is disposed directly below and in abutting engagement with the lower surface of the extended portion of the body 8 when the members are placed in operative position. The forward edge of the portion 14 is provided with an arcuate notch 15 for receiving the crank when the device is placed in operative position. The extended portion of the body 8 and the portion 14 are provided with registering openings 16 which are positioned at one side of the central longitudinal axis of the plate and these openings are adapted to receive an ordinary padlock when the device is in operative position.

In operation of the improved device the members 6 and 7 are swung in opposite direction on the pivot pin 12 and the handle of the starting crank 4 is placed in the opening 13 formed on the extension of the body 8 and the device is then moved upwardly on the starting crank. The starting crank is then pushed rearward so that the rear end of the same comes into direct engagement with the ratchet face of the crank shaft and the member 6 is then placed over the axle 3 and the lower member 7 is swung on its pivot and brought upwardly into engagement with the lower and forward surface of the axle and into engagement with the crank. The shank of the padlock is then placed through the registering apertures 16 and the device is locked in position and absolutely prevents movement of the crank or engine by unauthorized persons.

From the foregoing description it can be seen that an improved attachment is provided for automobiles which effectively locks the crank and engine against movement and thus prevents the theft of the machine.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

As an article of manufacture, a locking device for a motor vehicle starting crank comprising a pair of angle plates provided in one edge with interlocking rolled portions forming hinge members, a hinge pin extended through said hinge members, said plate being adapted for clamping engagement around the vehicle axle, one of said plates having an outturned portion connected with its upwardly directed end and provided with a concaved recess in its outer edge, the remaining plate resting upon said outwardly directed portion of the first mentioned plate being provided with a starting crank accommodating opening, a portion of the wall of which is parallel with the wall of the concaved recess in the first-mentioned plate, whereby the starting crank may be engaged by both plates when extended through the opening of the second mentioned plate, said plates being provided in their parallel portions with registering openings of a comparatively smaller diameter, and a locking member removably engaged through the last mentioned openings of said plate to lock the plates in engagement with the starting crank.

In testimony whereof I affix my signature in presence of two witnesses.

JOHN K. STROSNIDER.

Witnesses:
 CHAS. CROZIER,
 E. M. HARRIS.